(12) United States Patent
Lenker

(10) Patent No.: US 9,580,009 B1
(45) Date of Patent: Feb. 28, 2017

(54) SYSTEMS AND METHODS FOR MOTORBIKE COLLISION AVOIDANCE

(71) Applicant: Karl Lenker, Vero Beach, FL (US)

(72) Inventor: Karl Lenker, Vero Beach, FL (US)

( * ) Notice: Subject to any disclaimer, the term of this patent is extended or adjusted under 35 U.S.C. 154(b) by 0 days.

(21) Appl. No.: 14/958,973

(22) Filed: Dec. 4, 2015

(51) Int. Cl.
  *B60Q 1/52* (2006.01)
  *B62J 6/04* (2006.01)
  *G01C 9/02* (2006.01)

(52) U.S. Cl.
  CPC .. *B60Q 1/52* (2013.01); *B62J 6/04* (2013.01); *G01C 9/02* (2013.01)

(58) Field of Classification Search
  CPC ............ B60Q 1/50; B60Q 1/506; B60Q 1/52; B60Q 1/525; B62J 6/00; B62J 6/04; G01C 9/06; G01C 2009/066; G01C 9/02
  See application file for complete search history.

(56) References Cited

U.S. PATENT DOCUMENTS

| | | | | |
|---|---|---|---|---|
| 4,860,177 A * | 8/1989 | Simms | ..................... | B62J 6/003 315/76 |
| 5,561,414 A * | 10/1996 | Chin | ..................... | B62J 6/04 340/331 |
| 6,034,594 A * | 3/2000 | Gray | ..................... | B60Q 1/52 116/28 A |
| 8,405,498 B1 * | 3/2013 | Smith | ..................... | B60R 21/01 340/463 |
| 2002/0133282 A1 * | 9/2002 | Ryan | ..................... | B60Q 1/444 701/70 |
| 2005/0134439 A1 * | 6/2005 | Moore | ................. | A42B 3/0453 340/432 |
| 2007/0241874 A1 * | 10/2007 | Okpysh | ................. | B60Q 1/444 340/479 |
| 2009/0268478 A1 * | 10/2009 | James | ..................... | B60Q 1/50 362/473 |
| 2015/0266414 A1 * | 9/2015 | Bailey | ..................... | B60Q 1/44 340/467 |

* cited by examiner

*Primary Examiner* — Barry Gooden, Jr.
(74) *Attorney, Agent, or Firm* — Clayton, McKay & Bailey, PC

(57) ABSTRACT

Described herein are systems and methods for motorbike collision avoidance. One or more sensors or devices can be used to monitor the operating conditions of a motorbike and, upon a determination that a collision or drop has occurred, or is likely to occur, an alert system can be activated. The alert system can comprise one or more auxiliary illumination devices and/or acoustic devices configured to draw the attention of other motorists. The alert system may aid the other motorists in noticing the motorbike and approximating the motorbike's position, size, distance, or speed. The alert system can also be activated by the motorbike rider to communicate to other motorists that the rider believes a collision is possible or that a situation requires caution.

18 Claims, 7 Drawing Sheets

SYSTEMS AND METHODS FOR MOTORBIKE COLLISION AVOIDANCE

FIELD OF THE DISCLOSURE

The embodiments relate generally to systems and methods for motorbike collision avoidance and, more specifically, systems and methods that activate an alert system based, at least in part, on receiving information indicative of motorbike instability, a drop, a collision, or an anticipated collision.

BACKGROUND

The root cause of most motorcycle accidents is the failure of other vehicle drivers to notice a motorcycle, its proximity, and/or gauge its speed and the potential for a collision. All too frequently, vehicles pull out in front of oncoming motorcycles, leaving the motorcycle rider with limited options to avoid a collision. Due to their relatively small size and single headlight configuration, motorcycles, mopeds, and scooters often elude detection by other drivers with tragic results.

In fact, a 2009 study by the U.S. Insurance Institute for Highway Safety found that more than half of motorcyclist deaths involve at least one other vehicle. 42% of two-vehicle fatal motorcycle crashes involve a vehicle turning left while the motorcycle was going straight, passing, or overtaking the vehicle.

Motorbike riders are also at risk when at a standstill, i.e., after a collision, or when stopped in traffic, at traffic lights, or stop signs. Approaching vehicle drivers may not see a stopped/fallen motorbike, may fail to appreciate that the motorbike is either stopped or preparing to stop, or may fail to accurately gauge the distance to the stopped or slowing motorbike.

When collisions do occur, motorbikes offer little protection to riders. Riders can mitigate some risk by wearing helmets and other protective gear, but avoiding collisions altogether is the best way to reduce motorbike fatalities and injuries.

Riders are also in a precarious position after an accident when the motorbike and/or rider may be laying on a driving surface. The headlights and tail lights of a motorbike may be insufficient to properly alert other vehicle drivers of the crashed motorbike's presence, particularly in instances where the crashed motorbike comes to rest in a position where one or more of the headlights and tail lights is obscured or broken. Further, in instances where the motorbike and/or the rider comes to rest some distance off of the driving surface, existing lights on a motorbike may be insufficient to draw other motorists attention who may be in a position to render aid or call emergency responders.

Thus, a need exists for improved systems and techniques for alerting other vehicle drivers to the presence of a motorbike, particularly in instances when motorbike riders are most at risk or a collision is possible. Moreover, when a collision does occur, improved devices and techniques are needed to make other motorists aware of the crash and alert those in a position to render aid or medical attention.

SUMMARY OF THE DISCLOSURE

In accordance with certain embodiments of the present disclosure, systems and methods for motorbike collision avoidance, including increasing the visual signature of a motorbike, are disclosed. An illustrative system can comprise one or more auxiliary illumination devices, one or more inertial measurement devices, and a processing unit configured to receive signals from the one or more inertial measurement devices and activate the one or more alert devices. As used herein, the term "inertial measurement devices" can include, but is not limited to, inclinometers, accelerometers, gyroscopes, tilt indicators, pitch & roll indicators, and any other device suitable for detecting or measuring linear or angular motion, acceleration, velocity, tilt, lean, or angle. Alert devices can include, but are not limited to, one or more auxiliary illumination devices, integrated illumination devices (including headlights, turn signals, and/or brake lights), and acoustic devices (including one or more horns, sirens, speakers, bells, and/or whistles).

In one aspect, the processing unit can receive signals from the one or more inertial measurement devices and, upon determining a collision or drop has occurred or may occur, initiate activation of the one or more alert devices. For example, the processing unit may receive information from one or more inclinometers or other inertial measurement devices indicating that any one or more of a lateral lean, a forward lean, and a rear lean of the motorbike has exceeded a respective lean threshold.

The one or more inertial measurement devices can also transmit information indicating that the motorbike is unstable. For example, one or more inclinometers or other inertial measurement devices can transmit information indicating that while the motorbike is not leaning in any direction beyond a respective lean threshold, the lean in one or more directions is fluctuating with sufficient frequency to indicate that the motorbike is unstable or that the rider has lost control of the motorbike.

The processing unit can also receive signals from the one or more inertial measurement devices (e.g., accelerometer (s)) indicative of a sudden deceleration of the motorbike and/or an abrupt stop indicative of a collision.

Upon receiving signals from the one or more inertial measurement devices indicative of a collision, a drop, or instability (or the likelihood thereof), the alert devices, or a subset thereof, can be activated. Activation of the alert devices can alert other motorists to the presence of the motorbike, and help those motorists discern the location, size, distance, and speed of the motorbike.

Similarly, an illustrative method of avoiding motorbike collisions and/or increasing the visual signature of a motorbike can comprise sensing, by one or more inertial measurement devices, lean, deceleration, and stability conditions of a motorbike. A processing unit coupled to the one or more inertial measurement devices can then determine if information received from the inertial measurement devices is indicative of a collision, a drop, or instability. Upon making such a determination, the processing unit can initiate activation of one or more alert devices.

In some embodiments, the alert devices can include auxiliary illumination devices comprising a higher intensity light source and a lower intensity light source. The processing unit can also be in communication with a photodetector or a clock. If it is determined, based on information received by the photodetector or clock, that the motorbike is in daylight conditions or ambient/environmental light exceeds a threshold, then the higher intensity light sources of the auxiliary illumination devices can be activated to ensure activation of the illumination devices is visible to others. On the other hand, if it is determined, based on information received from the photodetector or clock, that the motorbike is in dark/nighttime conditions or ambient/environmental light is below a threshold, then the lower intensity light sources of the auxiliary illumination devices can be activated to avoid negatively impacting other motorists' ability to safely operate their vehicles.

In another aspect, the motorbike can comprise any one or more of front-, rear-, and side-facing auxiliary illumination devices. In one embodiment, where a plurality of front-, rear-, or side-facing auxiliary illumination devices are present, they may be separated by some distance to provide for a larger visual signature and communicate the size and dimensions of the motorbike to other drivers. For example, the motorbike may comprise a pair of front-facing auxiliary illumination devices, each located at opposing, distal ends of the motorbike's handlebars. Alternatively, the auxiliary illumination devices can comprise an array of light sources spanning some distance. For example, front-facing illumination devices can comprise an array of light sources distributed across the length of the motorbike's handlebars. Auxiliary illumination devices can also be distributed along the frame, chassis, and/or fork of the motorbike.

In a further embodiment, the alert system described herein can be configured to receive manual activation signals from the motorbike rider when the rider detects the possibility of a collision or suspects another motorist may not see the motorbike or appreciate its speed, distance, size, or position. In one embodiment, the motorbike rider can activate the alert system using a mechanism (e.g., button, switch, or lever) dedicated to the alert system. In other embodiments, the rider can activate the alert system by manipulating other components of the motorbike, such as long-pressing or tapping the horn, flashing the motorbike's high-beams, cycling the headlights on and off, turning on the motorbike's right and left turn signals concurrently, or tapping a predetermined number of times on the front brake lever(s). Of course these are just examples, and any suitable manipulation of the motorbike's components can be configured to activate the alert system. Additionally or alternatively, different mechanisms can be used to activate respective subsets of the alert system. For example, manipulation of the motorbike's high-beam, headlight, or turn signal switches in a predetermined fashion can initiate activation of one or more auxiliary illumination devices of the alert devices, while manipulation of the motorbike's horn in a predetermined fashion can initiate activation of one or more acoustic devices of the alert devices.

In another aspect, the rider can manually deactivate the alert devices in a substantially similar fashion or by simply repeating the procedure for activating the alert devices.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are illustrative and explanatory only and are not restrictive of the claims.

The accompanying drawings, which are incorporated in and constitute a part of this specification, illustrate several embodiments and together with the description, serve to explain the principles of the disclosure.

DESCRIPTION OF THE EMBODIMENTS

Figure 1:
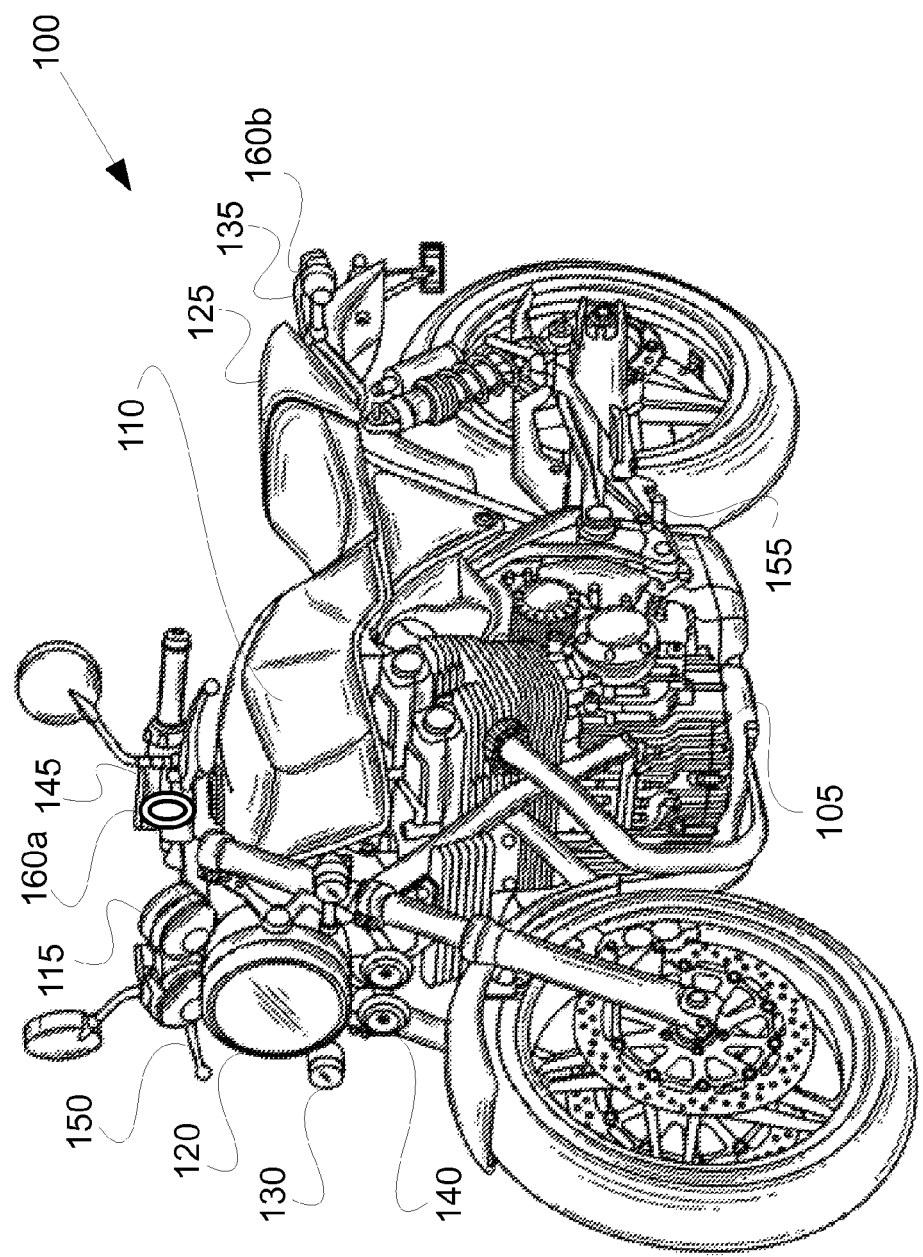
FIG. 1 depicts some aspects of an illustrative embodiment of a system as described herein.

Following a collision, a motorbike rider can be left in a precarious position, unprotected on a driving surface amid other passing vehicles. The motorbike itself can also present a hazard to those passing vehicles, particularly when the passing vehicle was proximate to the collision. In other instances, following a collision or a drop (i.e., a motorbike accident that does not involve another vehicle) a motorbike and its rider can come to rest some distance off of the driving surface. In such cases, passing motorists who may be in a position to render aid or call for help may not see the motorbike or rider.

Disclosed herein are embodiments of a system and method for motorbike collision avoidance and/or increasing motorists' awareness of a motorbike following or preceding a collision or a drop. In one aspect, the system can comprise one or more inertial measurement devices, a processing unit, and one or more alert devices. In use, the one or more inertial measurement devices can transmit signals to the processing unit indicative of the motorbike's lean conditions, acceleration/deceleration, and stability. Based at least in part on these signals, the processing unit can determine if a collision or drop has occurred or is likely to occur. The processing unit can also assess the stability of the motorbike. If it is determined that the motorbike is out of control, has suffered a collision, has suffered a drop, or is likely to suffer a collision or drop, the processing unit can initiate activation of one or more alert devices.

In one embodiment, the alert devices can include one or more illumination devices, comprising high-intensity light sources capable of attracting the attention of nearby motorists. Alternatively or additionally, the alert devices can include one or more acoustic devices configured to emit sound sufficient to attract the attention of other motorists. Motorists are then able to safely navigate around a wreck and either render aid or call for help.

In another aspect, systems and methods described here can be used to avoid collisions between motorbikes and other vehicles. Based on the size and single-headlight configuration of a motorbike, other motorists often fail to notice the presence of a motorbike or otherwise fail to accurately assess the location, distance, size, and speed of the motorbike.

In one embodiment, the systems and methods described here afford a motorbike rider the ability to manually activate the one or more alert devices when the rider anticipates a potential collision or otherwise wants to alert other motorists as to the motorcycle's presence.

Not only does activation of the alert devices in these instances draw motorists' attention to the motorbike and allow those motorists to more accurately gauge the location, distance, size, and speed of the motorbike, but activation of the alert devices can also serve as a communication from the motorbike rider to the motorists that the rider believes a collision with the motorist is possible.

While the systems and devices described herein may be depicted in the context of a motorbike, one skilled in the art will appreciate that the systems and methods described below can be implemented in conjunction with other vehicles, including but not limited to automobiles, utility vehicles, bicycles, scooters, mopeds, and any other vehicle that can benefit from a collision avoidance system and/or increasing the awareness of other motorists.

Reference will now be made in detail to certain illustrative embodiments, examples of which are illustrated in the accompanying drawings. Wherever possible, the same reference numbers will be used throughout the drawings to refer to the same or like items.

FIG. 1 depicts an illustrative embodiment of a motorbike 100. In one aspect, motorbike 100 may be a motorcycle, scooter, moped, or other two-wheel motorized vehicle. In another aspect, motorbike 100 may comprise a chassis 105, a body 110, an instrument cluster 115, headlight(s) 120, tail light(s) 125, front turn signal lights 130, rear turn signal lights 135, and horn 140. Motorbike 100 can further comprise an ignition switch for starting the motorbike and one or more switches, buttons, or levers 145 for activating and de-activating each of the headlights, tail lights, turn signals, and horn. Motorbike 100 can also comprise a front brake lever 150 and a rear brake pedal 155 for engaging the front and rear brakes, respectively.

In another aspect, motorbike 100 may comprise one or more auxiliary illumination devices or light sources 160. In one embodiment, auxiliary illumination devices 160 can comprise light sources having sufficient visibility (i.e., brightness, intensity, and range) to alert other vehicle drivers to the presence of motorbike 100. Auxiliary illumination devices 160 may comprise a light-emitting diode (LED) light source or some other suitable light source. Auxiliary illumination devices 160 may further comprise substantially front-facing auxiliary illumination devices 160a and substantially rear-facing auxiliary light sources 160b. In alternative embodiments, motorbike 100 may comprise fewer or additional auxiliary light sources, e.g., upward- or side-facing auxiliary light sources.

As depicted in FIG. 1, auxiliary illumination devices 160a and 160b can be distinct from other lights sources of motorbike 100. In alternative embodiments, one or more of the auxiliary illumination devices can be integrated with other light sources of motorbike 100, such as the front and rear turn signals, the headlights, or the taillights.

In another aspect, motorbike 100 may comprise a plurality of front- and or rear-facing auxiliary illumination devices spaced some distance apart from one another. For example, where front-facing, auxiliary illumination devices 160a are located on opposite handlebars of motorbike 100, as depicted in FIG. 1 (the illumination device 160a on the right handlebar is obscured in this view), the illumination devices can be spaced a distance apart from one another. In other embodiments, the front-facing illumination devices may be mounted in other locations, such as the opposing rear-view mirrors or at another location on the handlebars, frame, chassis, or forks of motorbike 100. Regardless of where each of a plurality of front-facing illumination devices are mounted with respect to one another, or where each of a plurality of rear-facing illumination devices are mounted with respect to one another, spacing them apart some distance or distributing them in an array can increase the visual signature of the motorbike and more clearly indicate to other motorists the size, width, speed, distance, or length of the motorbike versus a single light source.

In another aspect, motorbike 100 can comprise one or more acoustic devices, such as horns, sirens, speakers, bells, and/or whistles configured to emit sound sufficient to draw the attention of other motorists. The one or more acoustic devices can be a horn of the motorbike, a secondary acoustic device integrated with the horn of the motorbike, or an acoustic device mounted elsewhere on motorbike 100.

Figure 7:
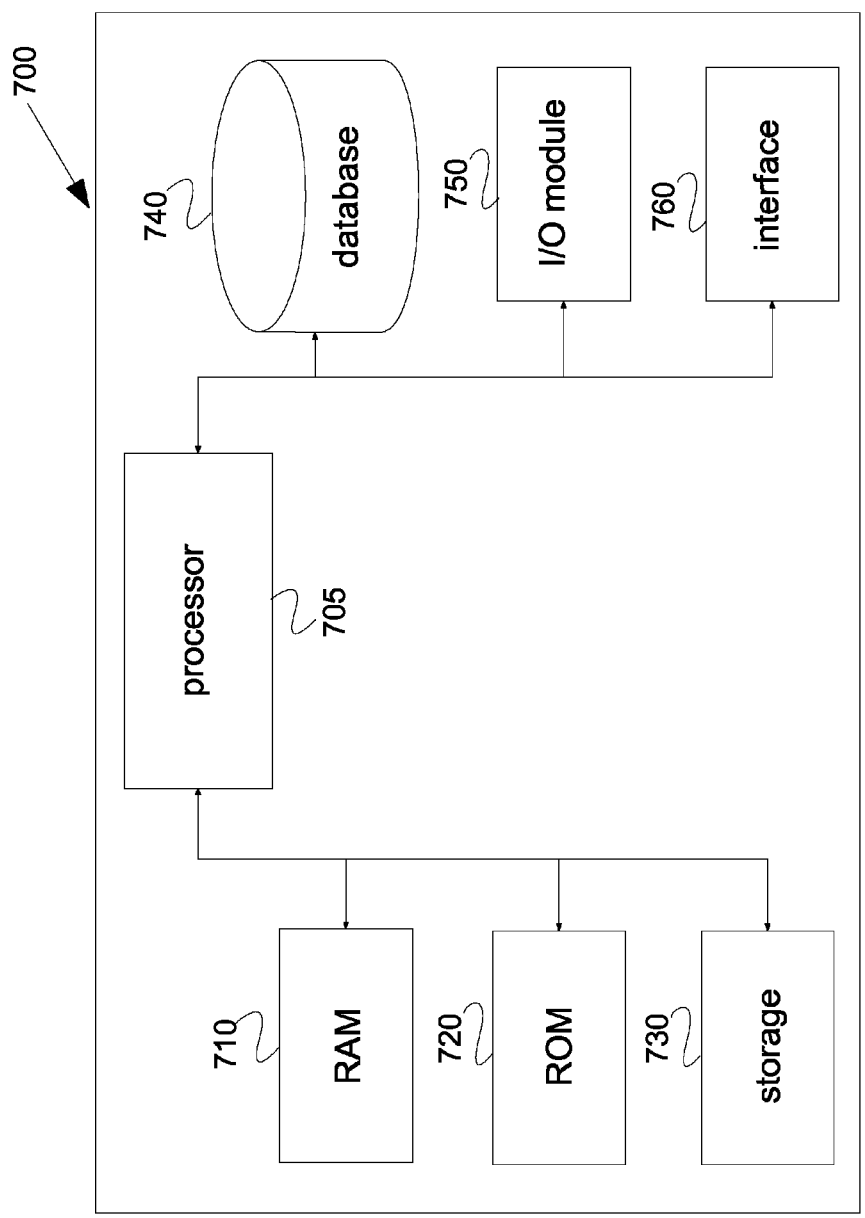
FIG. 7 depicts some aspects of an illustrative embodiment of a computing system as described herein.

In another aspect, motorbike 100 may comprise one or more inertial measurement devices and at least one computing system (described with respect to FIG. 7). In some embodiments, the accelerometer(s) and computing system may be contained or shielded from the elements by body 110. The inertial measurement device(s) may be any type of device suitable for detecting one or more of a lateral lean, front lean, and rear lean of motorbike 100, i.e, in the XYZ axis. For example, one or more of the inertial measurement devices may be a three-axis inclinometer for detecting each of the lateral, front, and rear lean of the motorbike. The inertial measurement devices, which may comprise one or more accelerometers, can also be configured to detect sudden decelerations indicative of a collision or abrupt stop. Body 110 of the motorbike may also comprise one or more impact sensors for detecting collisions and/or supplementing information provided by the inertial measurement devices.

In a further aspect, the inertial measurement device(s) may be configured to transmit lean and/or acceleration information to the computing system. The computing system may be configured to receive lean and/or acceleration information from the inertial measurement device(s) and, when one or more of a lateral, front, or rear lean of the motorbike exceeds a predetermined threshold or a collision is detected, the computing system can initiate activation of one or more alert devices, including all or a subset of the one or more auxiliary illumination devices and the one or more acoustic devices.

When activated, one or more auxiliary illumination devices may be set in a constant or steady illumination state. In alternative embodiments, one or more auxiliary illumination devices may be set to strobe or flash at a predetermined frequency or in accordance with a predetermined pattern. Such strobing or flashing can increase the visual signature of the motorbike as compared to a steady-state light source and draw the attention of other motorists. Similarly, the acoustic device(s) can be configured to emit sound at a predetermined volume, pitch, or pattern to draw the attention of others.

In further embodiments, one or more of the auxiliary illumination devices may comprise two light sources: a daytime light source and a nighttime light source. The daytime light source may exhibit a higher intensity or brightness as compared to the nighttime light source. For example, on a bright or sunny day, a higher intensity light may be required to sufficiently increase the visual signature of the motorbike and draw the attention of other motorists. At nighttime, due to less ambient light, a lower intensity light may be sufficient to increase the visual signature of the motorbike. The lower intensity light may also prevent negatively impacting other motorists' ability to see and safely operate their vehicles in a dark environment.

Motorbike 100 may comprise a photodetector to determine a level of ambient/environmental light (i.e., determine whether it is "daytime" or "nighttime"). For example, if ambient light detected by the photodetector exceeds a predetermined threshold, it may be determined that it is daytime or that the higher intensity light sources of the auxiliary illumination devices should be activated. On the other hand, if the ambient light detected by the photodetector is below the predetermined threshold, it may be determined that it is nighttime or that the motorbike is in a tunnel or garage, or that the lower intensity light sources of the auxiliary illumination devices are adequate to alert other motorists to the motorbike.

In addition to comprising light sources of different intensity or brightness, one or more auxiliary illumination devices may comprise light sources of different colors. Each color can be used to convey additional information to other motorists. For example, a first color (e.g., orange or amber) can be illuminated if it is determined that the motorbike is leaning (side, front, or rear) at an angle or decelerating at a rate exceeding a first predetermined threshold, and a second color (e.g., white) can be illuminated if it is determined that the motorbike is leaning at an angle or decelerating at a rate exceeding a second predetermined threshold greater than the first predetermined threshold. Thus, where the motorbike is leaning at a precarious angle or rapidly decelerating but no drop or collision has been detected, the first color light sources of one or more illumination devices may illuminate and where the motorbike experiences a collision, is leaning at a non-recoverable angle, or is on the ground (i.e., a drop has been detected), the second color light sources of one or more illumination devices may illuminate.

In another aspect, in addition to initiating activation of one or more alert devices upon detection of a lean or sudden deceleration (e.g., a deceleration indicative of a collision), the computing system may also initiate activation of other light sources of motorbike 100. Additionally or alternatively, the computing system may initiate activation of the horn or other acoustic devices of motorbike 100. Activation of additional light sources can serve to attract the attention of other motorists within view of the motorbike, and activation of the horn or other audio device can draw motorists' attention even in situations where motorbike 100 is no longer visible from the driving surface, where all illumination devices and light sources have been damaged or are otherwise inoperable, or when other motorists are not looking in the direction of the motorbike.

Figure 2:
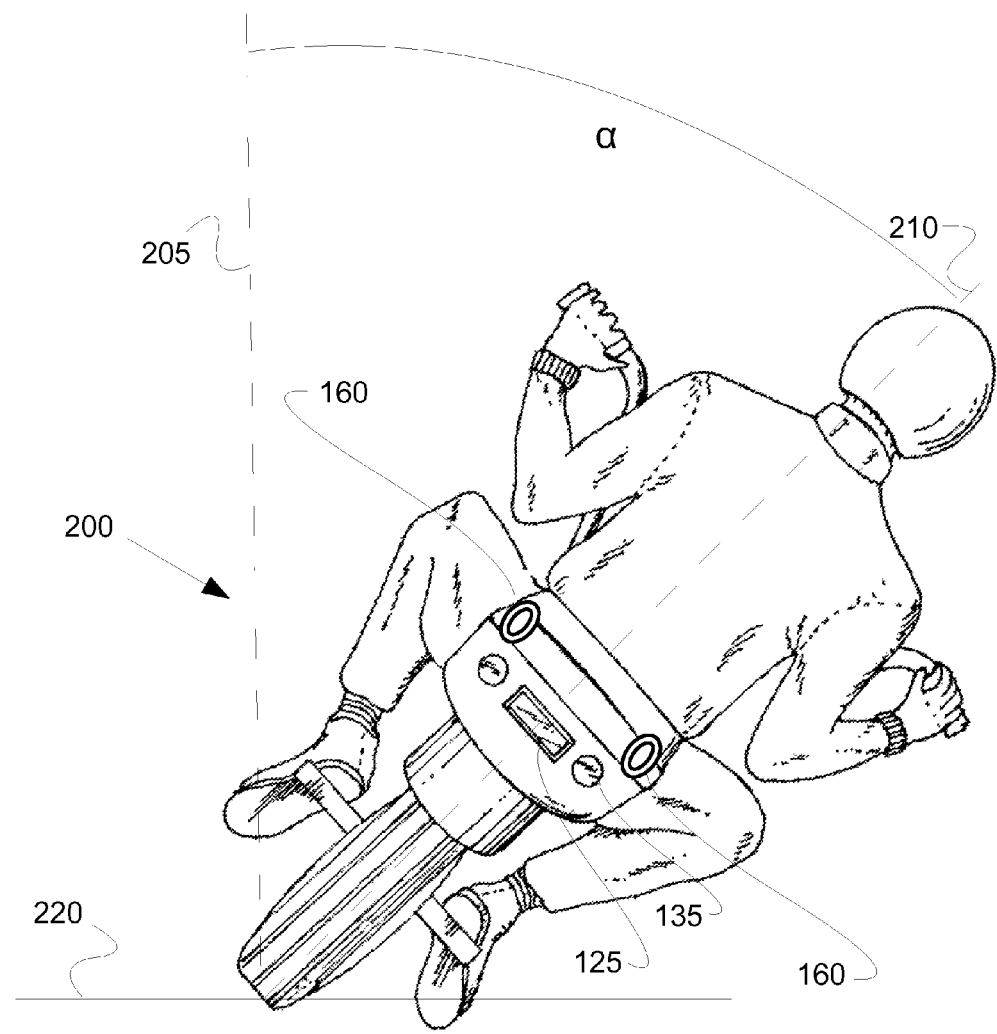
FIG. 2 depicts some aspects of an illustrative embodiment of a system as described herein.

FIG. 2 depicts a rear-view of a motorbike 200. Like motorbike 100, motorbike 200 can comprise one or more inertial measurement devices (not shown) for detecting one or more of a lateral lean, a front lean, a rear lean, a deceleration, a collision, and a drop.

In one aspect, one or more alert devices, such as auxiliary illumination devices 160 and/or any one or more acoustic devices, may be activated upon detection of a lateral lean exceeding a predetermined threshold angle $\alpha$. Although only rear-facing auxiliary illumination devices 160 are shown, it should be appreciated that any one or more auxiliary illumination devices 160 may be activated upon detection of a lateral lean exceeding angle $\alpha$. For example, any one or more of rear-, front-, and/or side-facing auxiliary illumination devices may be activated.

As depicted in FIG. 2, angle $\alpha$ can be an angle between a vertical axis or upright position 205 (i.e., perpendicular with respect to a driving surface 220) and the orientation of the motorbike 210. In other embodiments, angle $\alpha$ may be an angle between driving surface 220 and the orientation of the motorbike 210. It should also be noted that while FIG. 2 depicts a lateral lean to the rider's right side, angle $\alpha$ can be measured similarly in the case of a lateral lean to the rider's left side.

In another aspect, angle $\alpha$ can be set to a value indicative of an impending drop, or an unrecoverable lean (e.g., 70°-80°). In other embodiments, angle $\alpha$ can be set to a greater value (or smaller value where angle $\alpha$ is measured from the driving surface) indicating that a drop or a collision has already occurred (e.g., 90°). Alternatively, a user or motorbike rider may be afforded an opportunity to select angle $\alpha$. More experienced riders or those preparing for a fast-paced ride with sharp turns may desire a higher threshold angle $\alpha$ (e.g., 85°) than less experienced riders or riders who do not anticipate significant lateral leans (e.g., 30°-60°). In this manner, a rider can customize activation of the auxiliary illumination devices and avoid "false alarms" or unnecessary/unwarranted activation of the system. It should be noted that an alert system that only activates when necessary or warranted may be more effective than an alert system that is activated at all times or more often than needed. The sudden and/or relatively rare activation of the system is more likely to draw the attention of other motorists and be interpreted as an event meriting close attention.

In a further aspect, in the event motorcycle 200 recovers from a lean or near drop that exceeded the threshold angle $\alpha$, one or more inertial measurement devices may be deactivated. For example, if one or more inclinometers detects motorbike 200 at a lateral lean less than the threshold angle $\alpha$ within some period (e.g., one second) of the time at which the lateral lean exceeded angle $\alpha$, one or more auxiliary illumination devices and/or acoustic devices may be deactivated.

In other embodiments, following one or more inclinometers detecting a lateral lean exceeding angle $\alpha$ and activation of one or more alert devices, the alert devices may only be deactivated upon motorbike 200 exhibiting stability for some duration. For example, after activation of one or more alert devices as a result of a detected lean, the alert devices may only be deactivated after the motorbike maintains a lateral lean less than angle $\alpha$ for a period (e.g., 15 or 30 seconds). In still further embodiments, the motorbike may be required to maintain a lateral lean at some other predetermined angle which is less than angle $\alpha$ for a period before deactivation of the alert devices. For example, where the lateral lean required to trigger activation of the alert devices is 70°, the motorbike may have to exhibit a lateral lean of not more than 30° for a ten second period before deactivation of the alert devices.

Of course, while the deactivation of the alert devices based on returned stability of the motorbike has been discussed here in the context of a lateral lean, one should appreciate that the same systems and processes can be implemented in the context of forward and rear leans (described below with respect to FIGS. 3A and 3B).

Figure 3:
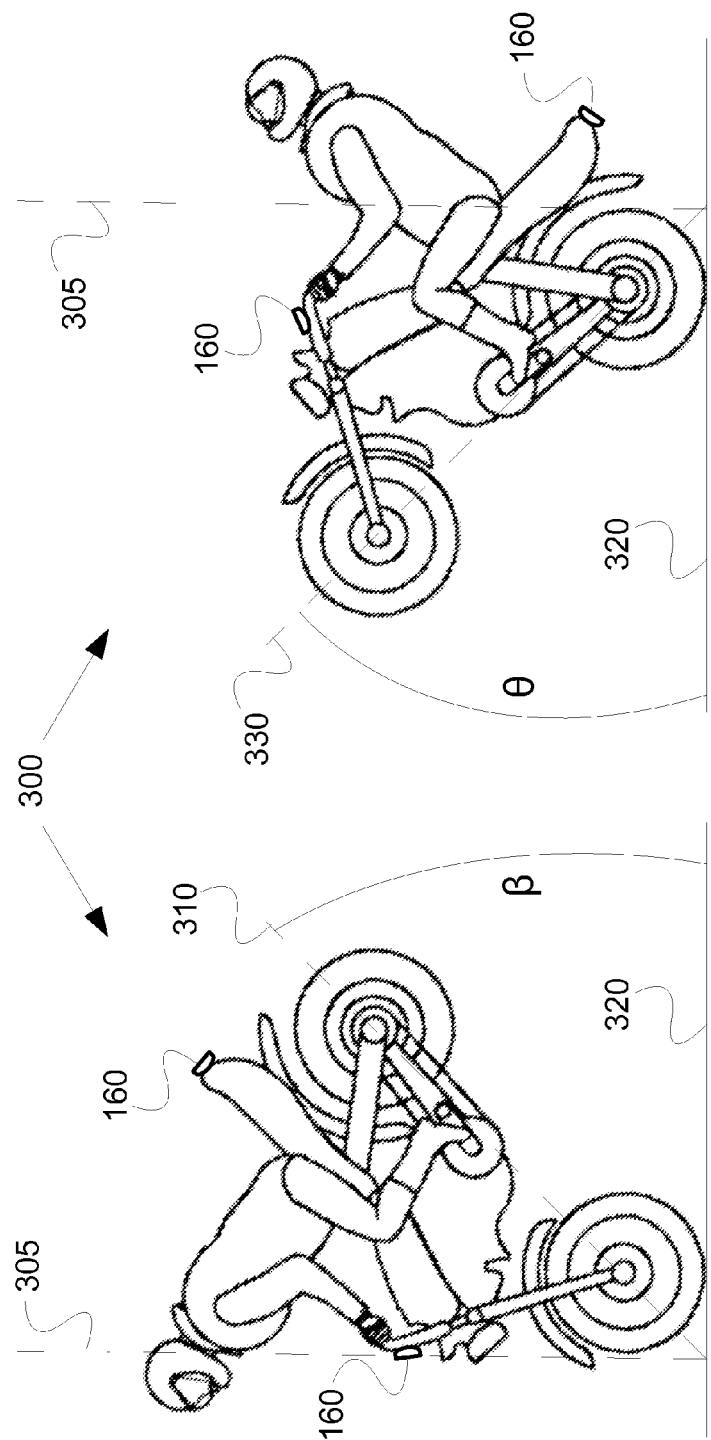
FIGS. 3A-3B depict some aspects of illustrative embodiments of a system as described herein.

FIG. 3A depicts a side-view of a motorbike 300. Like motorbike 100 and 200, motorbike 300 can comprise one or more inertial measurement devices (not shown) for detecting one or more of a lateral lean, a front lean, a rear lean, a deceleration, a collision, and a drop.

In one aspect, one or more auxiliary illumination devices 160 and/or acoustic devices may be activated upon detection of a front lean exceeding a predetermined threshold angle $\beta$. Although front- and rear-facing auxiliary illumination devices 160 are shown, it should be appreciated that any one or more auxiliary illumination devices 160 may be activated upon detection of a front lean exceeding angle $\beta$. For example, any one or more of rear-, front-, and/or side-facing auxiliary illumination devices may be activated.

As depicted in FIG. 3A, angle $\beta$ can be an angle between a driving surface 320 and the orientation of the motorbike 310. In other embodiments, angle $\beta$ may be an angle between vertical axis 305 (i.e., perpendicular with respect to driving surface 320) and the orientation of the motorbike 310.

In another aspect, angle β can be set to a value indicative of an impending drop or flip, or an unrecoverable lean (e.g., 50°-60°). In other embodiments, angle β can be set to a greater value (or smaller value where angle β is measured from the vertical 305) indicating that a drop, flip, or a collision has already occurred (e.g., 90°). Alternatively, a user or motorbike rider may be afforded an opportunity to select angle β. More experienced riders or those preparing for stunts may desire a higher threshold angle β (e.g., 60°) than less experienced riders or riders who do not anticipate significant front leans (e.g., 20°). Thus, a rider can customize activation of the alert devices and avoid "false alarms" or unnecessary/unwarranted activation of the system.

FIG. 3B depicts another side-view of a motorbike 300. In one embodiment, one or more auxiliary illumination devices 160 and/or acoustic devices may be activated upon detection of a rear lean exceeding a predetermined threshold angle θ. Although front- and rear-facing auxiliary illumination devices 160 are shown, it should be appreciated that any one or more auxiliary illumination devices 160 may be activated upon detection of a rear lean exceeding angle θ. For example, any one or more of rear-, front-, and/or side-facing auxiliary illumination devices may be activated.

As depicted in FIG. 3B, angle θ can be an angle between a driving surface 320 and the orientation of the motorbike 330. In other embodiments, angle θ may be an angle between vertical axis 305 (i.e., perpendicular with respect to driving surface 320) and the orientation of the motorbike 330.

In another aspect, angle θ can be set to a value indicative of an impending drop or flip, or an unrecoverable lean (e.g., 50°-60°). In other embodiments, angle θ can be set to a greater value (or smaller value where angle θ is measured from the vertical 305) indicating that a drop, flip, or a collision has already occurred (e.g., 90°). Alternatively, a user or motorbike rider may be afforded an opportunity to select angle θ. More experienced riders or those preparing for stunts may desire a higher threshold angle θ (e.g., 60°) than less experienced riders or riders who do not anticipate significant rear leans (e.g., 20°). Thus, a rider can customize activation of the alert devices and avoid "false alarms" or unnecessary/unwarranted activation of the system.

Figure 4:
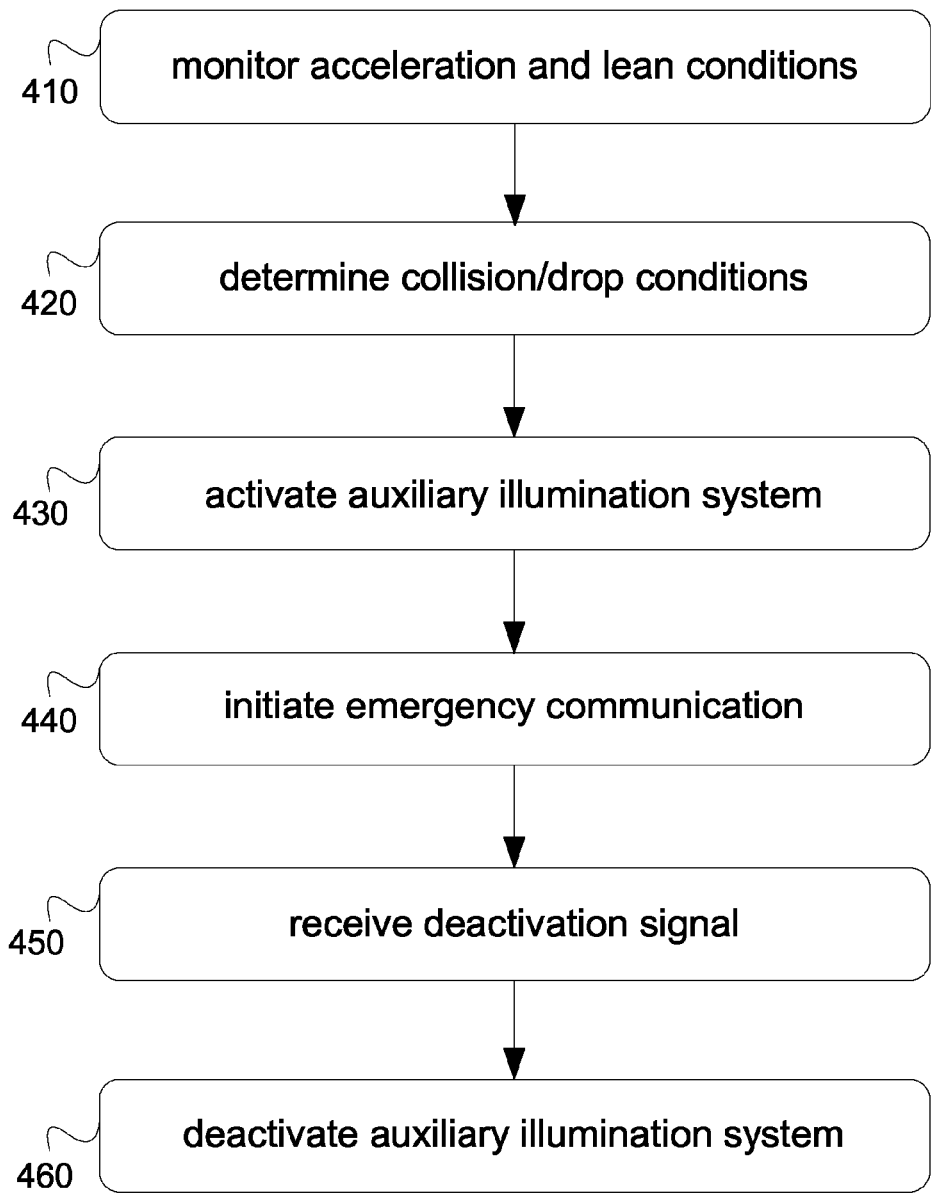
FIG. 4 depicts some aspects of an illustrative embodiment of a method as described herein.

FIG. 4 depicts one embodiment of a method for activating one or more alert devices, including one or more auxiliary illumination devices, one or more acoustic devices, or a combination of both (collectively referred to as an alert system). At stage 410, one or more inertial measurement devices of a motorbike may monitor the lean, acceleration, and/or positioning of a motorbike. For example, the one or more inertial measurement devices may monitor acceleration events, lateral lean, front lean, and rear lean of the motorbike.

At stage 420, a computing system of the motorbike may receive information from the one or more inertial measurement devices and determine that the information is indicative of collision or drop conditions. For example, the computing system may determine, based at least in part on the information transmitted from the one or more inertial measurement devices indicating a sudden deceleration, that a collision has occurred or a collision is about to occur (or is otherwise likely to occur). Alternatively or additionally, the computing system may determine, based at least in part on lateral, front, and/or rear lean information transmitted from the one or more inertial measurement devices exceeding a respective threshold, that a drop has occurred or a drop is about to occur (or is otherwise likely to occur). For brevity, determination of a collision, impending collision, drop, or impending drop may all be referred to as an "activation event." In some embodiments, the computing system may further determine, based at least in part on information received from a photodetector or clock, whether it is daytime or nighttime.

Upon determination of an activation event, at stage 430, the computing system can activate the alert system or any portion thereof. For example, the computing system can activate all or any subset of the auxiliary illumination devices, all or any subset of the acoustic devices, or a combination of the auxiliary illumination devices and acoustic devices. In embodiments where one or more auxiliary illumination devices comprise both a higher intensity light source and a lower intensity light source (relative to the higher intensity light source), the higher intensity light source(s) can be activated during daytime conditions and the lower intensity light source(s) can be activated during nighttime conditions. As described previously, the auxiliary illumination devices can also be configured to strobe or flash at a predetermined frequency in order to draw motorists' attention.

Increasing the visual signature of the motorbike after a collision, before a potential collision, after a drop, or before a potential drop will alert other motorists of the potential danger and allow them to avoid striking the motorbike and/or to render aid to an injured rider or other accident victims.

Moreover, should the motorbike and/or rider leave the driving surface, the increased visual signature can alert other drivers to the presence of the motorbike who may be in a position to call for help or render aid, even in situations where the motorbike would otherwise be difficult to detect or obscured. Similarly, the acoustic devices can emit sound sufficient to draw the attention of passing motorists.

In further embodiments, the motorbike may comprise a communication module configured for transmitting information to a communication device of the motorbike rider. In one embodiment, the communication device of the motorbike rider can be a cellphone, a smart phone, wearable device, or other mobile, processor-based or controller-based device. The communication module can be configured to transmit information to the communication device via any suitable communication channel, including but not limited to RF signal, Bluetooth, cell signal, wi-fi, or any suitable near-field communication channel. In alternative embodiments, the communication device can be integrated into the motorbike and the computing system can transmit information directly to the communication device. Regardless of the implementation, the computing system can be configured to initiate a message transmission from the communication device to third parties. The message can be in the form of a text message, email, phone call, or other suitable form.

At stage 440, the computing system can initiate message transmission to one or more third parties to report the activation event. For example, upon determination of the activation event, the computing system can initiate a message transmission to emergency responders or a private party charged with monitoring activation event alerts. The message may comprise, for example, one or more of location information, rider identification information, any pertinent medical information of the rider (drug allergies, known medical conditions, blood type, etc.), and driving history information. Alternatively or additionally, the message can comprise information indicative of the nature of the activation event. For example the message can comprise information indicating that a collision has occurred or likely occurred, or that a drop has occurred or likely occurred.

In another aspect, a user or the motorbike rider may customize or otherwise identify one or more third parties to contact upon determination of an activation event. For example, the user or rider may provide contact information of one or more family members or emergency contacts. The user or rider may also be afforded an opportunity to customize the information conveyed in the message. In a further embodiment, the rider can provide customized messages to each recipient. For example, the rider can elect to send location information to emergency responders and a personal message to a loved one.

Although stages 430 and 440 are described serially, it should be appreciated that these stages can be performed in reverse order or in simultaneous or overlapping fashion.

At stages 450 and 460, if a deactivation signal is received at the computing system, the alert system can be deactivated. The deactivation signal can be initiated manually by the rider or an emergency responder. For example, the motorbike may comprise a switch, button, or lever for deactivating the alert system. Alternatively, as described above, the alert system can be deactivated if the computing system receives information from the one or more inertial measurement devices that the motorbike has stabilized or no threat of a collision or drop exists.

Where a message has been transmitted to one or more third parties prior to reception of a deactivation signal, a cancellation message can be transmitted to the one or more third parties informing them to disregard the previous message.

Although FIGS. 2, 3A, and 3B describe activation of the alert system triggered by a detected lean (lateral, front, and/or rear) exceeding a predetermined threshold, other condition-related events can also trigger system activation. For example, the alert system can be triggered upon detection of a sudden deceleration exceeding a predetermined threshold, an impact or collision (as detected by one or more impact sensors), or motorbike instability (e.g., wobble or lean variations).

Figure 5:
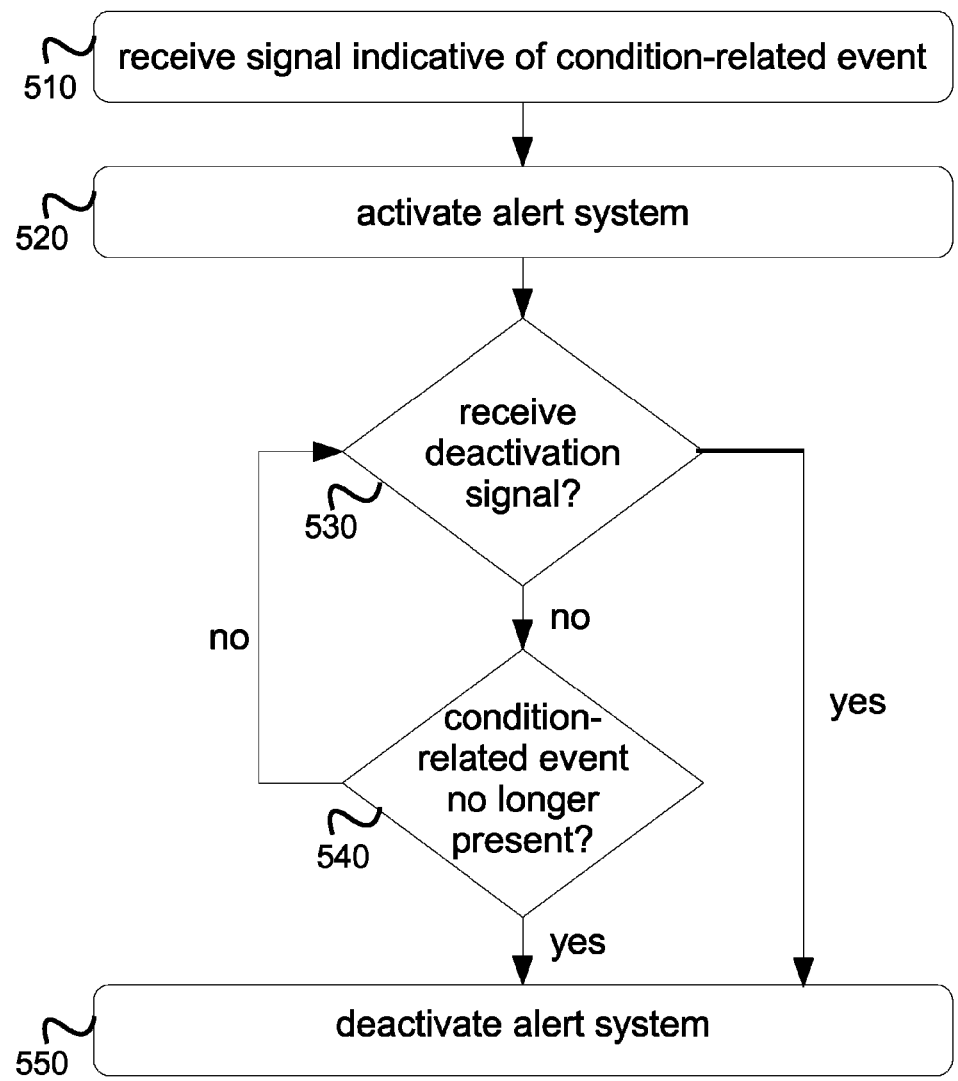
FIG. 5 depicts some aspects of an illustrative embodiment of a method as described herein.

FIG. 5 depicts an embodiment of a method for activating an alert system based, at least in part, on receiving information indicative of such a condition-related event.

At stage 510, the computing system may receive a signal indicative of a condition-related event. In one embodiment, the condition-related event may be a sudden deceleration. In such an embodiment, one or more inertial measurement devices, such as accelerometers, may transmit information to the computing system indicating that the motorbike has experienced a deceleration that exceeds a predetermined threshold. As discussed above with respect to lean thresholds, the deceleration threshold may be selected by a user or rider based on experience or anticipated motorbike use.

Motorbike instability can also be a condition-related event for triggering the alert system. Even if a lateral, front, or rear lean of the motorbike does not exceed a respective threshold, motorbike instability may be determined based on rapid fluctuations in the motorbike's lean. For example, where a motorbike is rapidly fluctuating between a 10° leftward lean and a 10° rightward lean, the predetermined threshold for a lateral lean may not be exceeded, but the lean information is still indicative of motorbike instability and activation of the alert system may be merited. Thus, in addition to activating the alert system in response to exceeding a predetermined lean threshold, the alert system can be activated in response to detection of rapid lean fluctuations lasting more than a predetermined period (e.g., 3 seconds) or a lean change rate that exceeds a rate threshold or lasts longer than the predetermined period.

Motorbike riders can also be at risk during prolonged stops (e.g., stops in traffic, at traffic lights, or at stop signs). Approaching motorists may not see the motorcycle, or may not appreciate how far away it is or that it is stopped. As a result, the alert system, or some components thereof, can be activated during a prolonged stop. For example, where the one or more inertial measurement devices or the motorcycle's speedometer indicate that the motorcycle is at a stop for a time exceeding a predetermined threshold (e.g., 2 seconds), the computing system may initiate activation of the alert system.

At stage 520, upon receiving a signal indicative of a condition-related event, the computing system can initiate activation of the alert system.

After activation, the rider can manually deactivate the alert system at stage 530 if he or she determines that it is not necessary under the present circumstances. Further details regarding manual deactivation of the system are provided below with respect to FIG. 6.

Alternatively or additionally, at stage 540, the computing system can automatically transmit a system deactivation signal if it determines that the condition-related event that triggered activation of the system is no longer present. For example, where the alert system was triggered by the detection of a sudden deceleration, the computing system can transmit a system deactivation signal upon a determination that acceleration of the motorbike has resumed. Similarly, where the alert system was triggered by detection of instability (e.g., lean fluctuations or a lean change rate exceeding a threshold), the system can transmit a system deactivation signal if the motorbike exhibits stability for some period of time (e.g., the motorbike's lean fluctuates within a normal or low range (e.g., 5° or less) for 10 seconds). Where the alert system was triggered by detection of a prolonged stop, the system can transmit a system deactivation signal upon the detection of an acceleration, the motorbike exceeding a speed threshold, or where resumed movement of the motorbike is detected.

Where the computing system transmits an alert system deactivation signal in response to receiving a deactivation signal at stage 530 or upon determining that the condition-related event that triggered system activation is no longer present at stage 540, the alert system can be deactivated at stage 550.

Figure 6:
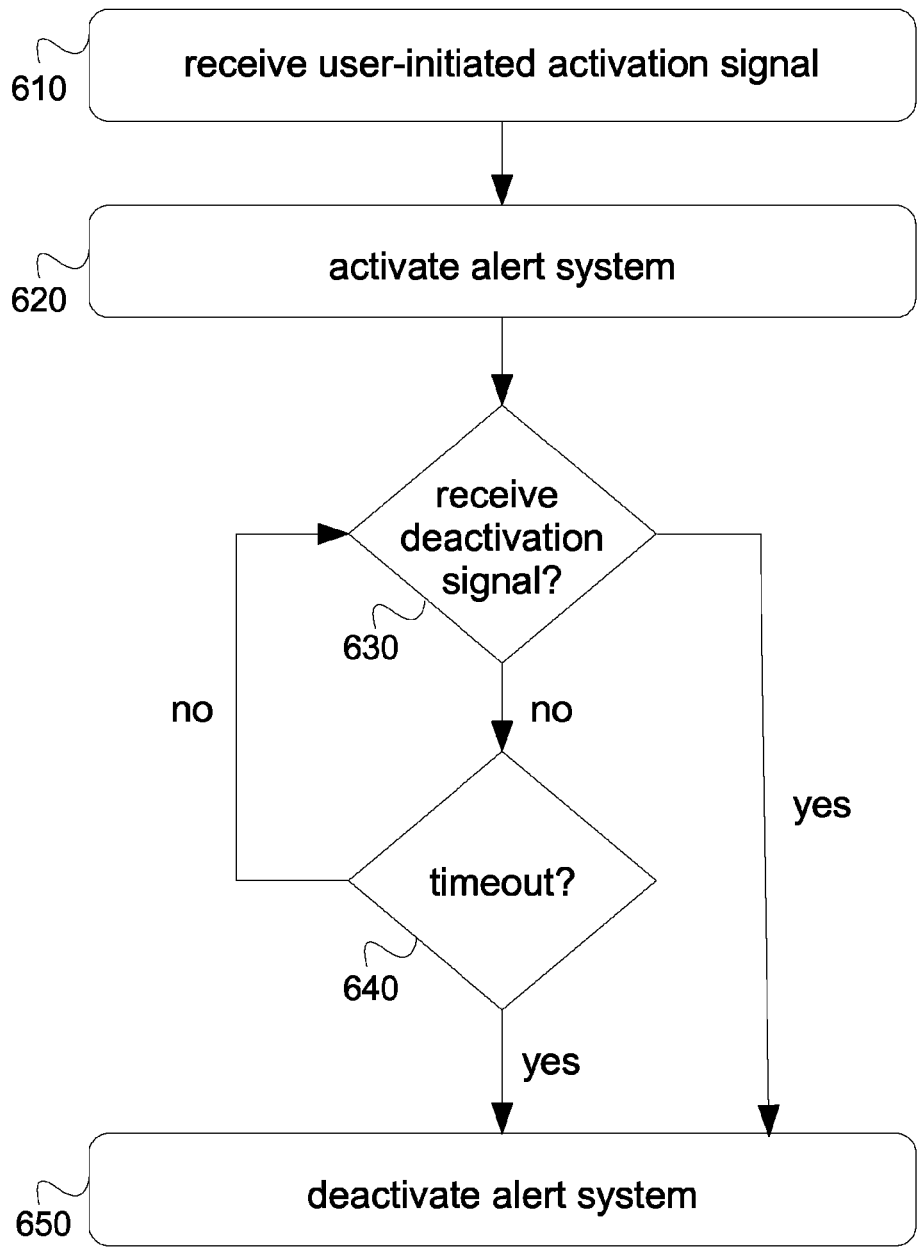
FIG. 6 depicts some aspects of an illustrative embodiment of a method as described herein.

FIG. 6 depicts an embodiment of a method for activating an alert system based, at least in part, on receiving a user- or rider-initiated activation signal. There may be instances in a rider's operation of a motorbike when he or she detects the possibility of a collision or suspects another motorist may not see the motorbike. For example, a motorbike rider approaching an intersection may see a vehicle about to make a left or right turn either crossing the motorbike's path or into the motorbike's path. Alternatively, a rider passing another vehicle on its left or right side may detect that the vehicle driver does not see the motorbike or that the vehicle is about to change lanes into the motorbike.

Regardless of the circumstances, when a rider detects the possibility of a collision or otherwise wants to draw the attention of other motorists to the motorbike, he or she can manually trigger activation of the alert system, or some portion thereof. Manual activation of the system can be accomplished in a number of ways. In one embodiment, the alert system can have a dedicated button, switch, or lever for activating the system. In other embodiments, the rider can activate the alert system by long-pressing or tapping the horn (e.g., a press longer than 1 second, or two or more taps), flashing the motorbike's high-beams, cycling the headlights on and off, turning on the motorbike's right and left turn signals concurrently, or tapping a predetermined number of times on the front brake lever(s) (e.g., tapping the front brake lever three times). Of course, these are only examples of how the rider can activate the alert system, and other suitable possibilities exist. In further embodiments, one or more activation mechanisms can be dedicated to portions of the alert system. For example, tapping the horn in a predetermined manner (e.g., two or more taps) can activate only the acoustic devices of the alert system. Flashing the motorbike's high-beams can activate only the auxiliary illumination devices of the alert system, or some portion thereof. Tapping the front brake in a predetermined manner can activate both acoustic and illumination devices of the alert system. Again, these are only examples and it should be appreciated that various activation triggers can be configured to correspond to activation of all or any subset of the alert devices.

It should be noted, however, that normal riding activity should not be interpreted as an alert system activation signal. For example, applying the front and rear brakes of the motorbike in an overlapping fashion (e.g., within 1 second of each other) can be indicative of a normal deceleration or stop and should not trigger activation of the alert system unless the deceleration threshold (described above) is exceeded.

In some embodiments, the rider may select one or more manual alert system activation triggers. Thus, a rider can select or customize manual triggers that he or she may find intuitive for activating the alert system but that won't be confused with the rider's normal driving behavior.

At stage 610, the computing system can receive the user-initiated activation signal and, in response, can initiate activation of the alert system at stage 620. As described previously, activation of the alert system is intended to draw the attention of nearby motorists and make them aware of the motorcycle's presence. The lights of the alert system may help motorists appreciate the size, distance, and location of the motorcycle, as well as more accurately gauge the motorcycle's speed. The alert system can also serve the purpose of communicating to other motorists that the motorcycle rider believes that there is the possibility for a collision or that the present circumstances merit caution. In embodiments where the horn or other acoustic device (e.g., a siren) is activated as part of the alert system, the system can also alert motorists that are not paying proper attention to their surroundings or not looking in the motorcycle's direction.

At stage 630, the computing system can receive a deactivation signal. A manual deactivation signal can be initiated by the user or motorbike rider in the same or a similar manner as the manual activation signal. In one embodiment, the alert system can have a dedicated button, switch, or lever for activating and deactivating the system. In other embodiments, the rider can deactivate the alert system by long-pressing or tapping the horn (e.g., a press longer than 1 second, or two or more taps), flashing the motorbike's high-beams, cycling the headlights on and off, turning on the motorbike's right and left turn signals concurrently, or tapping a predetermined number of times on the front brake lever(s) (e.g., tapping the front brake lever three times). In further embodiments, the rider can deactivate the alert system by repeating the procedure for activating the system. Of course, these are only examples of how the rider can deactivate the alert system, and other suitable possibilities exist.

At stage 640, if no deactivation signal has been received, the alert system can be automatically deactivated after a period of time (i.e., timeout). For example, upon activating the alert system in response to a manual activation signal from the rider, the alert system may remain on (in the absence of a manual deactivation signal) for a period, e.g., 10-30 seconds.

At stage 650, if a deactivation signal was received at stage 630 or activation of the alert system has timed out at stage 640, the alert system can be deactivated.

FIG. 7 depicts an illustrative processor-based computing system 700 representative of the type of computing system that may be present in or used in conjunction with any aspect of motorbike 100, 200, or 300. For example, processor-based computing system 700 may be used in conjunction with any one or more of transmitting or receiving signals to and from a dedicated alert system activation/deactivation mechanism, the headlights and high-beams switch, the front and rear brake levers, the horn switch, the ignition switch, one or more accelerometers, one or more photodetectors, one or more impact sensors, one or more auxiliary illumination devices, the headlights, the taillights, the turn signals, the horn, a communication device. Computing system 700 can also be used in conjunction with processing received signals, and storing, transmitting, or displaying information. Computing system 700 is illustrative only and does not exclude the possibility of another processor- or controller-based system being used in or with any of the aforementioned aspects of motorbikes 100, 200, or 300.

In one aspect, system 700 may include one or more hardware and/or software components configured to execute software programs, such as software for storing, processing, and analyzing data. For example, system 700 may include one or more hardware components such as, for example, processor 705, a random access memory (RAM) module 710, a read-only memory (ROM) module 720, a storage system 730, a database 740, one or more input/output (I/O) modules 750, and an interface module 760. Alternatively and/or additionally, system 700 may include one or more software components such as, for example, a computer-readable medium including computer-executable instructions for performing methods consistent with certain disclosed embodiments. It is contemplated that one or more of the hardware components listed above may be implemented using software. For example, storage 730 may include a software partition associated with one or more other hardware components of system 700. System 700 may include additional, fewer, and/or different components than those listed above. It is understood that the components listed above are illustrative only and not intended to be limiting or exclude suitable alternatives or additional components.

Processor 705 may include one or more processors, each configured to execute instructions and process data to perform one or more functions associated with system 700. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 7, processor 705 may be communicatively coupled to RAM 710, ROM 720, storage 730, database 740, I/O module 750, and interface module 760. Processor 705 may be configured to execute sequences of computer program instructions to perform various processes, which will be described in detail below. The computer program instructions may be loaded into RAM for execution by processor 705.

RAM 710 and ROM 720 may each include one or more devices for storing information associated with an operation of system 700 and/or processor 705. For example, ROM 720 may include a memory device configured to access and store information associated with system 700, including information for identifying, initializing, and monitoring the operation of one or more components and subsystems of system 700. RAM 710 may include a memory device for storing data associated with one or more operations of processor 705. For example, ROM 720 may load instructions into RAM 710 for execution by processor 705.

Storage 730 may include any type of storage device configured to store information that processor 705 may need to perform processes consistent with the disclosed embodiments.

Database 740 may include one or more software and/or hardware components that cooperate to store, organize, sort, filter, and/or arrange data used by system 700 and/or processor 705. For example, database 740 may include rider profile information, historical driving information, insurance information, historical auxiliary illumination system activation records, predetermined menu/display options, and other user preferences. Alternatively, database 740 may store additional and/or different information.

I/O module 750 may include one or more components configured to communicate information with a user associated with system 700. For example, I/O module 750 may comprise one or more buttons, switches, or touchscreens to allow a user to input parameters associated with system 700. I/O module 750 may also include a display including a graphical user interface (GUI) and/or one or more light sources for outputting information to the user. I/O module 750 may also include one or more communication channels for connecting system 700 to one or more peripheral devices such as, for example, a desktop computer, a laptop, a tablet, a smart phone, a smart watch, a flash drive, or a printer, to allow a user to input data to or output data from system 700.

Interface 760 may include one or more components configured to transmit and receive data via a communication network, such as the Internet, a local area network, a workstation peer-to-peer network, a direct link network, a wireless network, or any other suitable communication channel. For example, interface 760 may include one or more modulators, demodulators, multiplexers, demultiplexers, network communication devices, wireless devices, antennas, modems, and any other type of device configured to enable data communication via a communication network.

While illustrative embodiments have been illustrated and described, it will be appreciated that various changes can be made therein without departing from the spirit and scope of the disclosure. For example, though some methods presented here may be described as a series of steps, it will be appreciated that one or more steps can occur simultaneously, in an overlapping fashion, and in a different order. The order of steps presented are only illustrative of the possibilities and those steps can be executed or performed in any suitable fashion. Moreover, the various features of the embodiments described herein are not mutually exclusive. Rather any feature of any embodiment described herein may be incorporated into any other suitable embodiment.

Additional features may also be incorporated into the described systems and methods to improve their functionality. For example, those skilled in the art will recognize that the disclosure can be practiced with a variety of vehicles, including but not limited to automobiles, mass transit or public service vehicles, utility or agricultural vehicles, bicycles, or any other suitable vehicle where an alert system for increasing motorists' awareness of the vehicle may be desired.

In some embodiments, it may be appropriate to activate less than all of the components of the alert system. For example, where a motorbike rider perceives a need to stop suddenly, he or she may manually activate only rear-facing auxiliary illumination devices to alert motorists approaching from the rear of the motorbike. Activating less than all of the auxiliary illumination devices can conserve battery power, extend the lifetime of the light sources, and not needlessly distract motorists who are fully aware of the motorcycle or are not in danger of colliding with the motorbike.

Furthermore, while the figures depict motorbikes comprising one or more discrete auxiliary light sources, other embodiments can comprise auxiliary light source arrays. The light sources comprising the arrays can be configured to illuminate, flash, or strobe simultaneously or concurrently. Alternatively, the light sources of the array could be configured to illuminate, flash, or strobe to achieve some type of pattern or convey a message. For example, in the case of a rear- or front-facing array, if the individual light sources illuminate in sequence, left to right or sequentially, that may indicate that the motorbike rider intends to make a right turn or move into a right-hand lane.

The alert system described here can also include a built-in test ("BIT"). At startup of the motorbike (i.e., activation of the ignition switch), the alert system can perform a BIT to ensure that all components of the system are operable and functioning properly. For example, as part of the BIT, the processor may send and receive test signals to and from the various components, including but not limited to the inertial measurement devices, the auxiliary illumination devices, and the acoustic devices. In one embodiment, each auxiliary illumination device can illuminate (either simultaneously, serially, or in some other fashion) such that the rider can determine all lights are operational. Similarly, the acoustic device can emit a sound indicating that it is operational and that the BIT was performed and successfully completed.

Other embodiments of the aforementioned systems and methods will be apparent to those skilled in the art from consideration of the specification and practice of this disclosure. It is intended that the specification and the aforementioned examples and embodiments be considered as illustrative only, with the true scope and spirit of the disclosure being indicated by the following claims.

What is claimed is:

1. A system for motorbike collision avoidance, the system comprising:
   an inertial measurement device;
   at least one light source; and
   a processor configured to receive a signal from the inertial measurement device and based, at least in part, on the signal, activate the at least one light source,
   wherein the signal from the inertial measurement device indicates that an angle of the motorbike is changing at a rate exceeding a predetermined threshold.

2. The apparatus of claim 1, wherein the signal from the inertial measurement device indicates motorbike lean fluctuations associated with instability of the motorbike.

3. The apparatus of claim 1, wherein the signal from the inertial measurement device indicates that the angle of the motorbike exceeds a predetermined threshold.

4. The apparatus of claim 3, wherein the predetermined threshold may be selected by a user.

5. The apparatus of claim 3, wherein the angle is indicative of at least one of a lateral lean, a front lean, and a rear lean.

6. The apparatus of claim 5, wherein the inertial measurement device comprises at least one inclinometer configured to sense the lateral lean, the front lean, and the rear lean.

7. The apparatus of claim 6, wherein each of the lateral lean, the front lean, and the rear lean have a unique predetermined threshold.

8. A method for alerting motorists to a presence of a motorbike, the method comprising:
    sensing, by an inertial measurement device, an angle of the motorbike;
    determining, by a processor, that a signal received from the inertial measurement device is indicative of motorbike instability; and
    illuminating at least one illumination device, wherein the at least one illumination device comprises a first light source and a second light source, the first light source having a greater intensity than the second light source.

9. The method of claim 8, wherein the illuminating of the at least one illumination device comprises flashing at least one of the first light source or the second light source at a predetermined frequency.

10. The method of claim 8, wherein the illuminating of the at least one illumination device comprises illuminating a pair of illumination devices, the illumination devices located a distance apart from one another.

11. The method of claim 8, wherein the illuminating of the at least one illumination device comprises:
    illuminating the first light source when ambient light exceeds a threshold; and
    illuminating the second light source when the ambient light is less than or equal to the threshold.

12. The method of claim 11, wherein the ambient light is determined using a photodetector.

13. A non-transitory, computer-readable medium containing instructions that, when executed by a processor, cause the processor to perform stages comprising:
    receiving a first signal from an inertial measurement device indicating that an angle between a motorbike and a surface is changing at a rate that exceeds a threshold; and
    in response to the receiving of the first signal from the inertial measurement device, activating at least one illumination device coupled to the motorbike.

14. The computer-readable medium of claim 13, further comprising:
    receiving a second signal from the inertial measurement device indicating that the angle between the motorbike and the surface is below a threshold angle; and
    in response to the receiving of the second signal from the inertial measurement device, deactivating the at least one illumination device.

15. The computer-readable medium of claim 14, wherein a time elapsed between the receiving of the first signal and the second signal is one second or less.

16. The computer-readable medium of claim 13, further comprising:
    in response to the receiving of the first signal from the inertial measurement device, transmitting a signal to a communication device to initiate a communication to at least one third party.

17. The computer-readable medium of claim 16, wherein the at least one third party comprises a predetermined list of third parties provided by a user.

18. The computer-readable medium of claim 16, wherein the communication comprises information indicating a location of the motorbike and status information indicative of why the communication was initiated.

\* \* \* \* \*